May 26, 1925.
L. E. HOLLAND
LAWN SPRINKLER
Filed Sept. 4, 1923
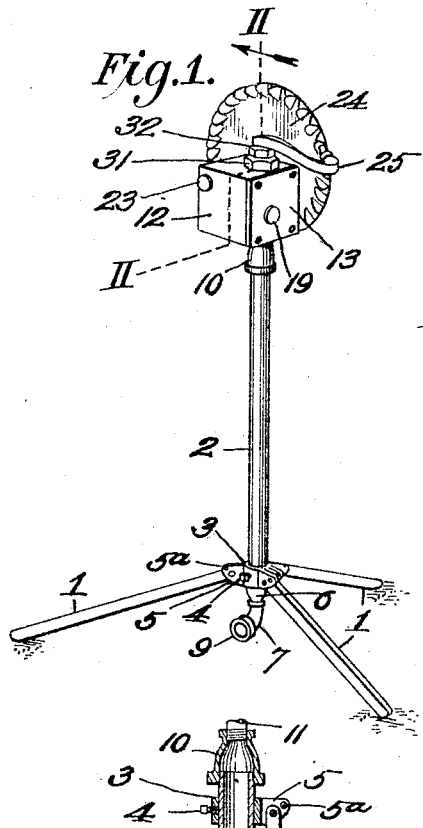
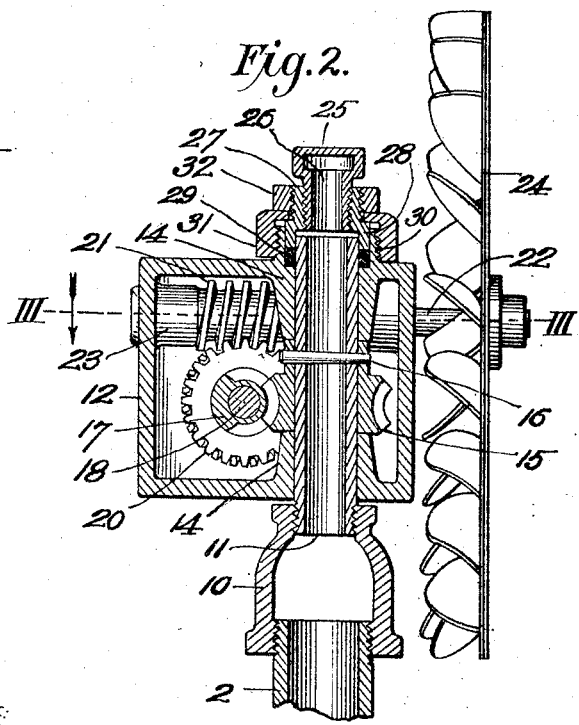
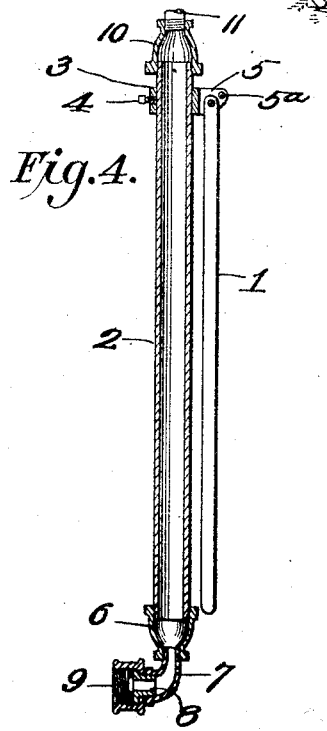
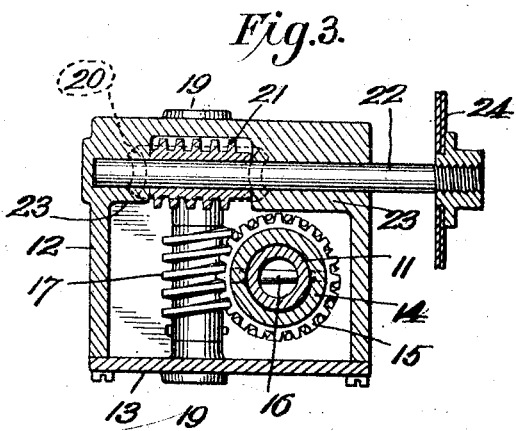
INVENTOR.
L. E. Holland
BY
Thorpe Gerard
ATTORNEYS Patented May 26, 1925.

1,539,189

UNITED STATES PATENT OFFICE.

LOUIS E. HOLLAND, OF KANSAS CITY, MISSOURI.

LAWN SPRINKLER.

Application filed September 4, 1923. Serial No. 660,730.

*To all whom it may concern:*

Be it known that I, LOUIS E. HOLLAND, a citizen of the United States, and a resident of Kansas City, county of Jackson, State of Missouri, have invented a certain new and useful Improvement in Lawn Sprinklers, of which the following is a complete specification.

This invention relates to lawn sprinklers of that class utilizing the force of water from a nozzle to rotate a spreader wheel, and the rotation of the latter to turn a carrying-head for the nozzle and the spreader wheel, to cause them to travel circularly around a fixed vertical axis, and the object of the invention is to produce a sprinkler of this class of simple, compact, inexpensive, durable and efficient construction.

A further object is to provide a device of this character having a stand pipe and legs susceptible of adjustment vertically on the stand pipe and foldable to parallel relation therewith for convenience of storage and transportation.

With these objects in view, the invention consists in certain new and useful features of construction and combinations of parts as hereinafter described and claimed; and in order that it may be fully understood reference is to be had to the accompanying drawing, in which:—

Figure 1 is a perspective view of a sprinkler embodying the invention.

Figure 2 is an enlarged vertical section taken on the line II—II of Figure 1.

Figure 3 is a horizontal section taken on the line III—III of Figure 2, but showing only a fragment of the spreader wheel.

Figure 4 is an enlarged vertical section of the supporting elements of the sprinkler, the figure showing the legs in adjusted and folded condition.

Referring to the drawing in detail, where like reference characters identify corresponding parts in all of the figures, 1 indicates a plurality of legs radiating from a vertical stand pipe 2, a collar 3 being slidably adjustable on the stand pipe and secured at any desired position thereon by a set screw 4, and said collar is provided with bifurcated lugs 5, to which are pivotally secured the legs 1, the lugs having cross pins 5ª for limiting the spread of the legs so that they shall afford a stable support for the sprinkler.

Secured upon the lower end of the stand pipe 2 is a reducing coupling 6, and engaged with said coupling is an elbow 7, in which is secured a nipple 8 by a threaded coupling 9, the latter being adapted to be screwed on a fitting of a hose or the like for the supply of water to the stand pipe. A reducing coupling 10 is mounted on the upper end of the stand pipe and secured at its lower end in said coupling 10 is a stationary vertical tube 11.

A hollow box 12, having a removable face plate 13, is journaled eccentrically on the vertical tube 11, being provided with internal hubs 14 projecting from its upper and lower sides to form substantial journal bearings. A worm wheel 15 fits on the tube 11 between the hubs 14 within the box, and secured rigidly to said tube by a cross pin 16 or in any other equivalent manner. A horizontal worm 17 is enmeshed with the worm wheel 15 and is mounted on a horizontal shaft 18 supported at its ends by bearings 19 rigid with the walls of the box. Rigid with the worm 17 and mounted on shaft 18, is a large worm wheel 20 enmeshed with an overlying horizontal worm 21 mounted rigidly on a horizontal shaft 22 extending through the box at right angles to shaft 18 and journaled in bearings 23 rigid with the box. The said shaft 22 projects from the box at one side, and on such projecting end carries a bladed water spreading or distributing wheel 24, the arrangement being such that when said wheel is turned, power is transmitted through the worm 21 to worm wheel 20 and worm 17, and the latter through its engagement with the stationary worm wheel 15, is caused by said wheel, to travel circularly as a planet gear around a sun gear, the connection of the shafts 18 and 22 with the box, causing the latter to likewise turn and thus circulate the wheel 24 bodily around the stationary tube 11 without interfering with the rotation of said wheel around its own axis.

A nozzle 25 is arranged to discharge water against the blades of said spreader wheel, and is provided with a depending stem 26 having threaded engagement with a fitting 27 having an enlarged lower end 28 fitting over the upper end of the stationary tube 11, and engaging packing 29 to form a water-tight joint with said tube. The enlargement 28 of said fitting, which of course bears a journaled relation to said tube, fits in an externally-threaded nipple 30 projecting upward from the box, and said nipple is engaged by a flanged nut 31 overlapping the enlargement of fitting 27 to hold the latter in place. A lock nut 32 engages the fitting 27 and bears upon the flanged nut to secure the same reliably in place.

Assuming that the sprinkler is in set-up position as shown by Figure 1, and that a hose or the like is connected to coupling 9, and the water turned on, it will be apparent that the water will be discharged by the nozzle 25 against the blades of wheel 24 and thus revolve the same around its own axis and hence effect turning movement of the box, with the nozzle and wheel 24, around the stationary tube as hereinbefore pointed out, and that this action will continue as long as the supply of water is maintained. It will also be apparent that the structure as shown and described is of strong and durable make and has no parts readily susceptible to breakage or material wear, and that it embodies all the other features of advantage set forth as desirable in the statement of the object of the invention.

I claim:

1. In a lawn sprinkler, a stationary upright water tube, a box journaled directly thereon for horizontal rotation, a nozzle carried by the box and in communication with the said tube, a horizontal shaft journaled in the box, a bladed water spreader wheel on the shaft with its blades in the line of water discharge from the nozzle to receive the impact of the water to turn said shaft, a worm on said shaft, a worm wheel within the box and rigid on the said tube, a horizontal shaft journaled in the box in the horizontal plane of the worm on the tube and extending at right angles to the first-named horizontal shaft, and a worm and worm wheel on said second shaft and respectively enmeshed with the worm wheel on the tube and the worm on the first-named shaft for utilizing the resistance of the last-named worm wheel to rotate the box on the said tube when the wheel is turned around its own axis by water from the nozzle.

2. A lawn sprinkler comprising a stand pipe, a reducer upon the pipe, a vertical tube in communication and rigid with the reducer, a box having vertically-spaced hubs journaled on the tube, a worm wheel rigid on the tube between the said hubs, a horizontal shaft journaled in the box and provided with a worm engaging said worm wheel and with a worm wheel, a second horizontal shaft extending at right angles to the first and also journaled in said box and projecting from the same, a worm on said shaft engaging the last-mentioned worm wheel, a bladed water distributing or spreader wheel secured on the said shaft externally of the box, and a nozzle mounted on the box and communicating at one end with said vertical tube and adapted to discharge at its opposite end against the said water wheel to rotate the same and cause it by such rotation to turn the said box around the said vertical tube.

In witness whereof I hereunto affix my signature.

LOUIS E. HOLLAND.